Dec. 13, 1960     R. R. WAREHAM     2,963,948
FLASH SYNCHRONIZED CAMERA SHUTTER
Original Filed April 29, 1955     4 Sheets-Sheet 1

INVENTOR
Richard R. Wareham

BY Brown and Mikulka
ATTORNEYS

Dec. 13, 1960 R. R. WAREHAM 2,963,948
FLASH SYNCHRONIZED CAMERA SHUTTER
Original Filed April 29, 1955 4 Sheets-Sheet 2

INVENTOR
Richard R. Wareham

BY Brown and Mikulka
ATTORNEYS

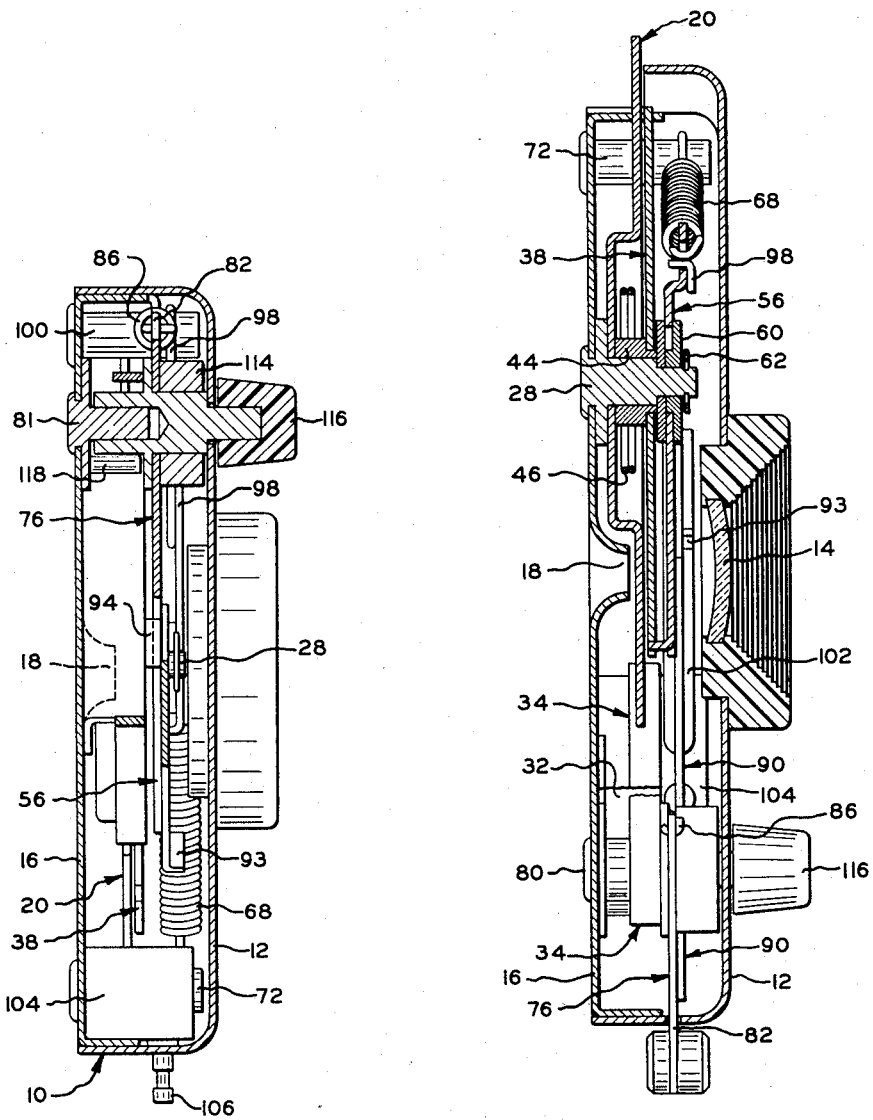

Dec. 13, 1960  R. R. WAREHAM  2,963,948
FLASH SYNCHRONIZED CAMERA SHUTTER
Original Filed April 29, 1955  4 Sheets-Sheet 4

INVENTOR
Richard R. Wareham

BY Brown and Mikulka
ATTORNEYS

United States Patent Office 2,963,948
Patented Dec. 13, 1960

2,963,948

FLASH SYNCHRONIZED CAMERA SHUTTER

Richard R. Wareham, Marblehead, Mass., assignor to Polaroid Corporation, Cambridge, Mass., a corporation of Delaware Original application Apr. 29, 1955, Ser. No. 504,757, now Patent No. 2,878,736, dated Mar. 24, 1959. Divided and this application Feb. 6, 1958, Ser. No. 713,695

7 Claims. (Cl. 95—11.5)

This invention relates to photography and, more particularly, to a shutter and diaphragm mechanism in combination with novel means for completing a photoflash circuit.

The present application is a division of copending application Serial No. 504,757, filed April 29, 1955, now U.S. Patent No. 2,878,736.

A principal object of the present invention is to provide novel means including a cover blind for completing a photoflash circuit in synchronism with the release of a shutter blade for operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 3 is a section taken along the line 3—3 of Fig. 2;

Fig. 4 is a section taken along the line 4—4 of Fig. 2;

Generally, the present invention comprehends the provision of a shutter which is relatively simple and inexpensive in construction and capable of being set for a plurality of accurately predetermined shutter speeds. Shutter speed, as referred to herein, is to be regarded in terms of an exposure period during which light passes through the lens aperture. The shutter includes a pivotable shutter blade having therein a plurality of arcuate slots and a cover blind. The shutter blade is pivotable from a position of rest, with one of the arcuate slots positioned at one side of the lens aperture, to a cocked position, with said one slot positioned adjacent the other side of the lens aperture. The cover blind covers the lens aperture as said one slot moves across said aperture during pivotal movement of the shutter blade into cocked position, and is positioned to one side of the lens aperture during the return movement of the shutter blade as the slot passes across and uncovers the lens aperture. The exposure period is determined by the length of the slot and the speed of movement of the slot across the lens aperture. The shutter is adapted to incorporation with any of a variety of conventional cameras and is particularly suitable for use in cameras employing lenses of fixed focus and small relative aperture which are adapted to exposure of films having a "fast" emulsion. A rotatable disc-type diaphragm having a plurality of apertures of predetermined diameter is directly coupled with the shutter blade for controlling the shutter speed setting. This disc-type diaphragm permits formation therein of small apertures of exact light-admitting properties and is provided with indicia such as numbers for indicating the setting for particular combinations of shutter speed and aperture diameter.

Figure 1:
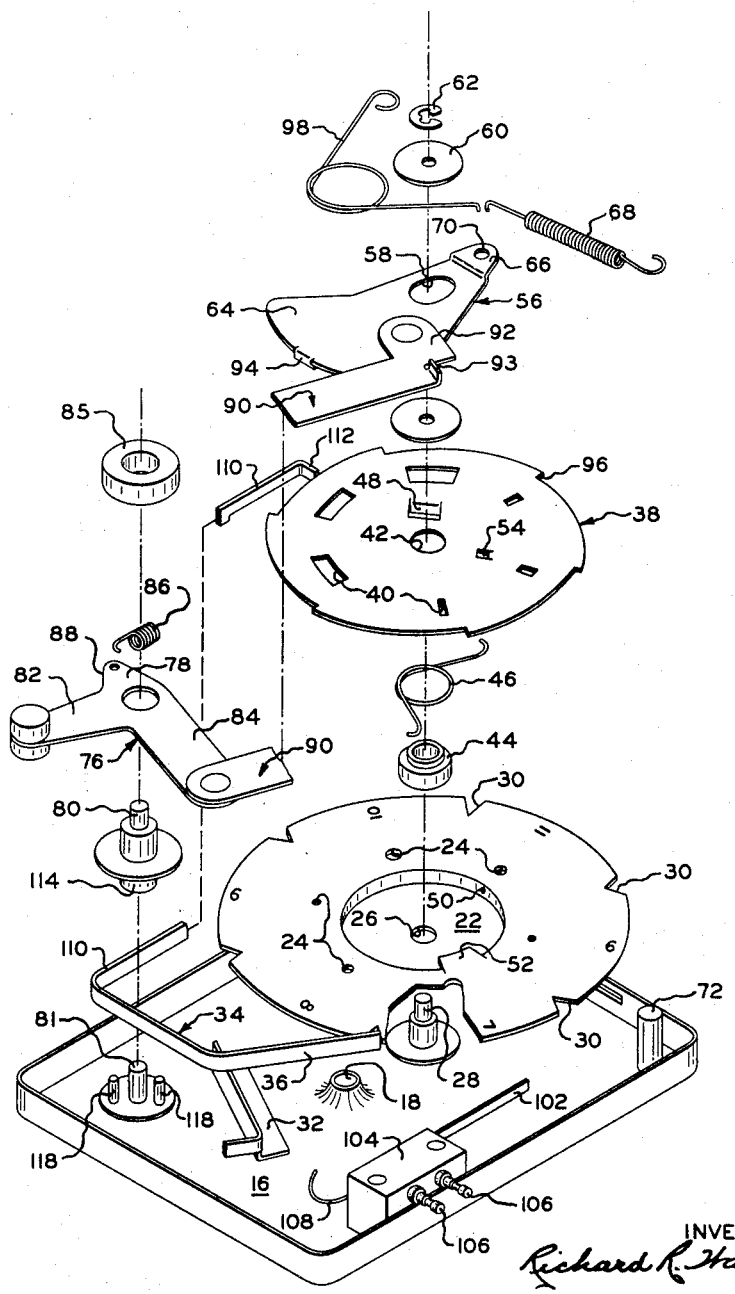
Figure 1 is an exploded view illustrating in perspective the elements of a shutter embodying the present invention.
Figure 2:
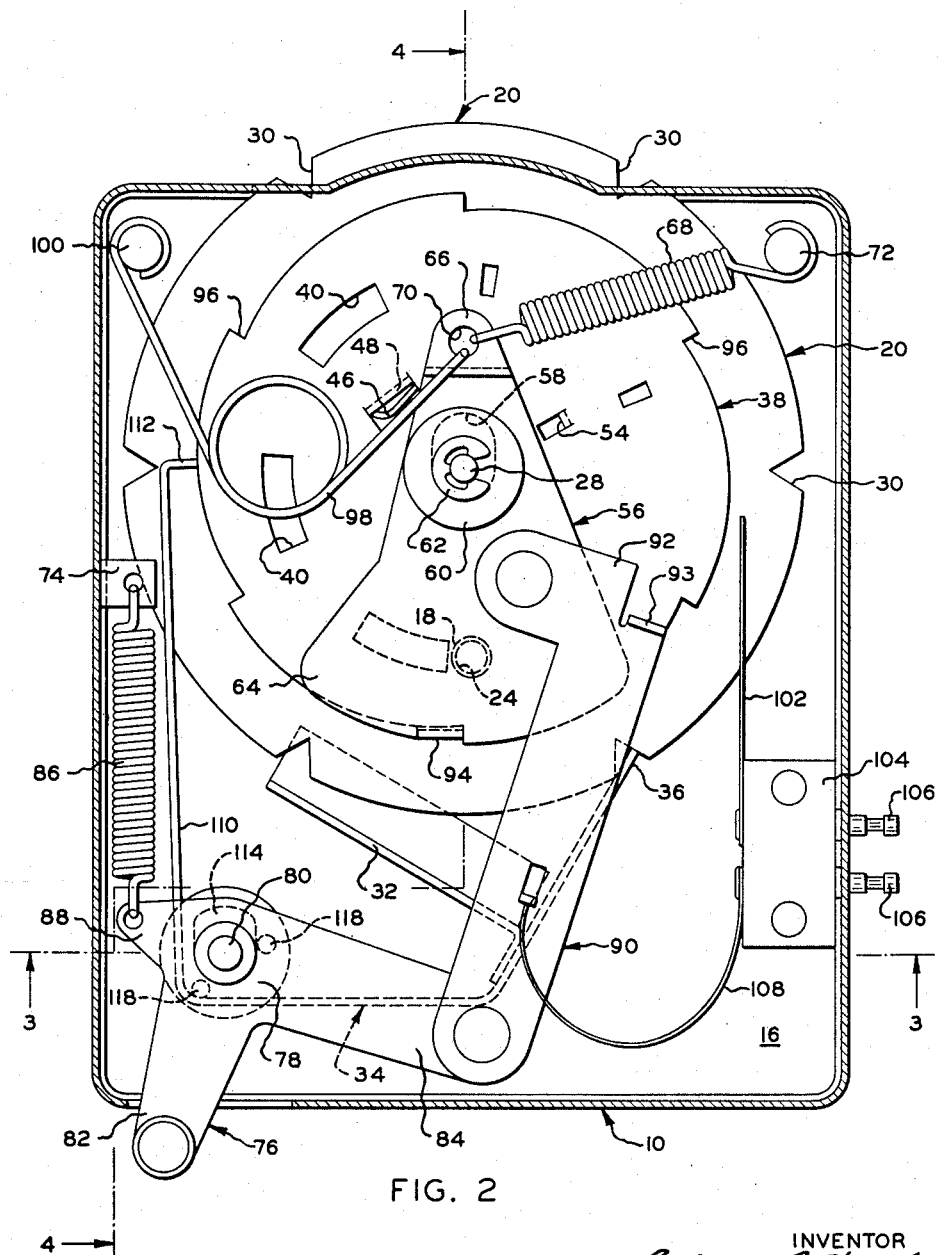
Fig. 2 is a front plan view of the shutter of Fig. 1 illustrated at the position of rest with the time latch in "instantaneous" position.
Figure 6:
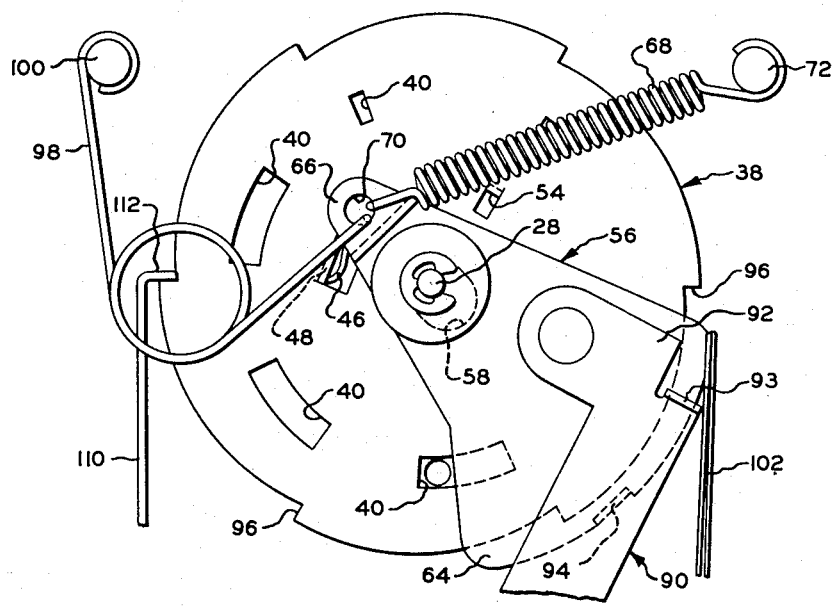
Fig. 6 is a plan view similar to that of Fig. 5 taken an instant after release of the shutter with the shutter blade shown retained in "bulb" exposure position.
Figure 5:
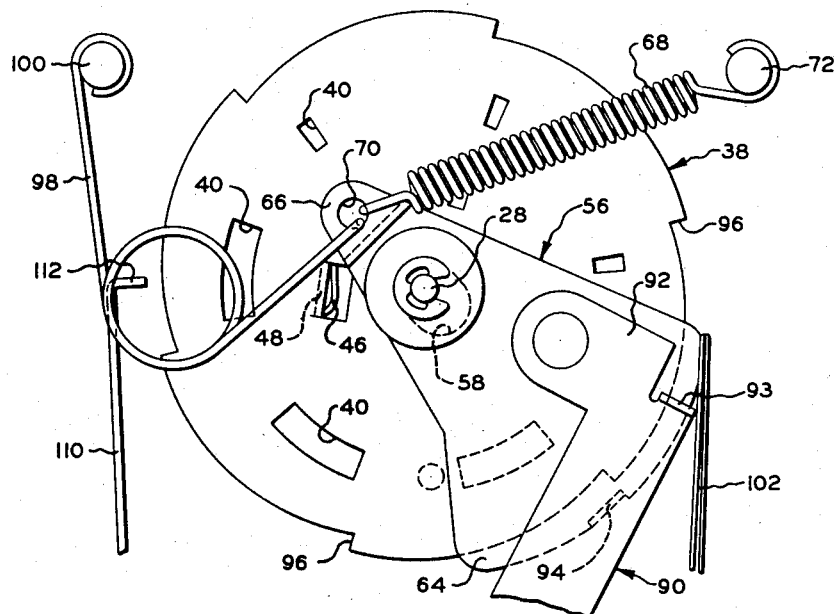
Fig. 5 is a plan view similar to that of Fig. 2 and illustrating the elements of the shutter at the instant of release.

Referring now to the drawings wherein like numerals denote like parts, there is shown in Figs. 1 through 5 a shutter mechanism, comprehended by the present invention, the associated elements of which are represented in Figs. 2 and 5 as they would appear from a position in front of the camera. Directions of the rotation and movement of the elements as hereinafter described are those which would be observed when said elements are viewed from the above described position, the descriptive language being in accordance with said point of observation.

As a means for enclosing and mounting the operative elements of the shutter mechanism, there is provided a generally rectangular housing 10 including a front portion 12, shown as mounting a conventional lens 14, and a rear portion 16 having a lens aperture 18 in alignment with the axis of lens 14. Front and rear portions 12 and 16 include relatively short side walls, the side walls of front portion 14 extending exteriorly of the side walls of rear portion 16 to aid in preventing the leakage of light through aperture 18.

An aperture control means is provided in association with lens aperture 18, said means comprising a disc-type diaphragm 20. Diaphragm 20 includes a central dished or recessed section 22, a plurality of evenly spaced exposure apertures 24 having predetermined diameters and a hole 26 at its center at which disc 20 is pivotally mounted to permit movement of any of apertures 24 into operative alignment with lens aperture 18. A short post or shaft 28 is secured in rear portion 16 and extends forward for pivotally mounting diaphragm 20 at hole 26 together with other elements of the shutter assembly. So that disc 20 may be rotated for bringing any particular aperture 24 into alignment with lens aperture 18, disc 20 is so mounted that a portion of its periphery extends through a slot in the side wall of housing 10 exteriorly of the housing and is manually engageable for pivoting the diaphragm. In order to hold an aperture 24 of disc 20 in operatively aligned position, disc 20 is provided with a plurality of evenly spaced V-shaped notches around its periphery, there being provided one notch for each aperture 24. A bracket 32 is secured to rear portion 16 for mounting an elongated detent spring 34 having one end portion 36 adapted to engage notches 30 so as to permit the rotation of disc 20 in only a counterclockwise direction and to retain disc 20 with any selected aperture 24 in alignment with lens aperture 18.

To control the passage of light through lens aperture 18 of the shutter, there is provided a shutter blade comprising a generally flat disc 38 having therein a plurality of predeterminedly spaced arcuate slots 40 of varying lengths. Shutter disc 38 includes a round opening 42 at its center at which shutter disc 38 is pivotally mounted adjacent diaphragm 20 on a hub 44 mounted on post 28. Shutter disc 38 is so mounted on hub 44 that slots 40 are movable in alignment with and across lens aperture 18 in order to uncover said aperture, the duration of the exposure effected thereby being proportional to the length of the slot crossing the lens aperture.

Shutter disc 38 is normally biased in a clockwise direction by a torsion spring 46 coiled around post 28 and positioned between shutter disc 38 and diaphragm disc 20 in dished section 22 of disc 20. Spring 46 is anchored at one end to a tab 48 turned up from shutter disc 38 toward diaphragm disc 20 and at its other end in a small hole 50 at the edge of dished section 22 of disc 20. Limit stops are provided for normally positioning shutter disc 38 so that a portion of said disc, between a pair of slots 40, overlies an exposure aperture 24 in alignment with lens aperture 18. These limit stops include tab 48 on shutter disc 38 adapted to engage a tab 52, turned up from diaphragm disc 20 toward disc 38, and thereby retain disc 38 against movement due to the bias of spring 46.

To move shutter disc 38 into a cocked position, the shutter disc is pivoted in a counterclockwise direction against the bias of spring 46 until a particular slot 40, which is normally positioned adjacent one side (the left viewing Fig. 2) of lens aperture 18, has moved across the lens aperture to the other side thereof. In order to prevent disc 38 from being pivoted too far in a counterclockwise direction so that another of slots 40 becomes aligned with lens aperture 18, there is provided a means for limiting the movement of said disc and, in the form shown, comprises a tab 54 turned up from shutter disc 38 toward diaphragm disc 20 and adapted to engage tab 52 on disc 20.

The shutter makes an exposure during the clockwise pivotal movement of the shutter disc under the bias of spring 46 from its cocked position to its original position of rest. The duration of the exposure, or the "shutter speed," is dependent upon the length of the slot which crosses the lens aperture and the rotational speed of disc 38 due to the force exerted by spring 46, and may be varied by rotating shutter disc 38 in a counterclockwise direction so as to move a particular one of slots 40 into position to cross lens aperture 18 and admit light therethrough. Rotation of shutter disc 38 provides for different shutter speeds and is effected by rotation of diaphragm disc 20 in a counterclockwise direction so that tab 52 on disc 20 engages tab 48 on shutter disc 38 to pivot disc 38 together with spring 46 in a counterclockwise direction with disc 20.

Diaphragm disc 20 is provided with a plurality of numbers inscribed on its peripheral portion which extends exteriorly of housing 10, one number being associated with each exposure aperture 24 and representing a light value. The light values may preferably correspond to light value numbers carried on the scale of a conventional exposure meter, thus permitting setting of the shutter directly according to the prevailing light value number indicated on the exposure meter scale without the necessity of first computing a correct setting. Rotation of diaphragm disc 20 to bring a given number thereon into view exteriorly of the shutter housing sets up a correlated shutter speed and diaphragm aperture providing a predetermined exposure value. In the illustrated embodiment, for example, the shutter may be set for any of six exposure values, diaphragm disc 20 being provided with six exposure apertures with numbers 6 through 11 around its periphery and shutter disc 38 including six exposure slots 40. Assuming the lowest number to indicate a low light value, for a prevailing light value of low intensity, diaphragm disc 20 is set so that No. 6 is visible on the portion of said disc extending exteriorly of housing 10. Thus, the largest exposure aperture of disc 20 is positioned in alignment with lens aperture 18 and the longest exposure slot 40 of shutter disc 38 is positioned adjacent and to one side (the left viewing Fig. 2) of the exposure aperture. In one form of shutter, for example having a lens of relatively small aperture, diaphragm disc 20 is provided with two sets of three apertures, the apertures of each set being so formed as to provide for three full stop steps such as $f/30$, $f/42$ and $f/60$, and shutter disc 38 includes two sets of three slots, the slots in each set being of equal length. Each set of three slots in disc 38 is operatively associated with a set of three apertures in disc 20, the slots being so formed as to provide for exposures of $\frac{1}{25}$ of a second at $f/30$, $f/42$ and $f/60$, and $\frac{1}{200}$ of a second at $f/30$, $f/42$ and $f/60$. By virtue of this arrangement, rotation of disc 20 through one full revolution is sufficient to set the shutter for any one of the series of six exposure values, each of which is one half the previous one.

As a means for pivoting shutter disc 38 into cocked position and covering the exposure aperture during pivotal movement of the disc, there is provided a cover blind or blade 56. Blade 56 is generally triangular in shape and includes a slot 58 mediate its ends and at which said blade is pivotally and slidably mounted adjacent shutter disc 38 on a hub 44 mounted on post 28 and retained thereon by a conventional retaining washer 60 and locking clip 62. The axis of slot 58 extends generally lengthwise of blade 56 and the center of post 28 is positioned to the left of lens aperture 18. Cover blind 56 includes a generally flat end section 64 positioned closely adjacent disc 38 and being enlarged so as to cover the lens aperture during pivotal movement of blade 56 during cocking of the shutter and a tapered end section 66. Blade 56 is normally retained in the position of rest covering lens aperture 18 by a coiled tension spring 68 secured at one end in a hole 70 in end section 66 and at its other end to a post 72 secured to rear housing portion 16.

Manually operable means, provided for pivoting blade 56 in a counterclockwise direction to cock and actuate the shutter, comprise a bell crank 76 having a central portion 78 at which it is pivotally mounted on a shaft 80 in turn pivotally mounted on a post 81 secured to rear housing portion 16, a manually engageable arm 82 extending exteriorly of the housing 10 through a slot formed therein, an actuating arm 84 extending from central portion 78 and a spacing washer 85 mounted on shaft 80 between crank 76 and housing portion 12. Crank 76 is biased in a clockwise direction by a tension spring 86 anchored at one end in bracket 74 and secured at its other end in an ear 88 extending from central portion 78 of crank 76. An elongated connecting lever 90 is pivotally secured at one end to the end of arm 84 and includes a right angle end section 92 at which lever 90 is pivotally secured to enlarged end section 64 of cover blind 56 at a point to the right (viewing Fig. 2) of the axis of slot 58 and the center of lens aperture 18. To actuate the shutter, the operator grasps and moves the portion of arm 82 extending exteriorly of the housing to the right to pivot crank 76 in a counterclockwise direction, this movement being transmitted through connecting lever 90 pivoting blade 56 in a counterclockwise direction.

To pivot shutter disc 38 in a counterclockwise direction into cocked position, end section 64 of cover blind 56 is provided with a tab 94 turned in from its end toward the rear of the shutter disc 38. Shutter disc 38 includes a plurality of ratchet-like shoulder portions 96 uniformly spaced around its periphery and adapted to be engaged by tab 94 during pivotal movement of blade 56 in a counterclockwise direction. Disc 38 includes one shoulder 96 for each exposure slot 40, each shoulder being so positioned as to be engaged by tab 94 when the slot 40, associated with the shoulder, is in position (at the left of the lens aperture) for making an exposure. As cover blind 56 is pivoted in a counterclockwise direction, tab 94 engages a shoulder 96, pivoting shutter disc 38 so that an exposure slot 40, together with end section 64 of blind 56, is moved to the right past lens aperture 18 into cocked position. When disc 38 reaches this predetermined cocked position, blade 56 moves in a linear direction parallel to the axis of slot 58 so that tab 94 is disengaged from the shoulder 96, releasing shutter disc 38 for pivotal movement in a clockwise direction under the bias of spring 46. To insure the rapid linear movement of blade 56 parallel to the axis of slot 58 at the proper moment during its pivotal movement, there is provided a coiled hairpin-type spring 98 having elongated ends, one of which is anchored in end section 66 of cover blind 56 at hole 70 and the other of which is anchored to a post 100 secured to rear housing portion 16. During movement of disc 38 into cocked position, cover blind 56 is urged upward (viewing Fig. 2) by lever 90 so that tab 94 is held in engagement with a shoulder 96. Cover blind 56 is pivoted, for example, through approximately 45° during cocking movement of shutter disc 38 so that at cocked position, the upward force exerted on blade 56 is no longer sufficient to prevent the linear movement of blade 56 under the bias of both springs 68 and 98, the effectiveness of which is increased as cover blind 56 is rotated. The point in the rotation of blade 56 at which linear movement and release of the shutter disc occurs is dependent upon the strength of springs 68 and 98, their positions and the direction of force exerted thereby. The release of shutter disc 38 for rotation under the bias of spring 46 is adapted to occur as end section 64 of cover blind 56 is pivoted out of alignment with the lens aperture and said aperture is uncovered. It is during the clockwise rotation of disc 38 that a slot 40 crosses the lens aperture to make an exposure, and upon release of crank 76, cover blind 56 returns to its original position of rest due to the bias of spring 68 and crank 76 returns under the bias of spring 86.

Means are provided for completing an electrical circuit to a photoflash lamp (not shown) in synchronism with the operation of the shutter mechanism and, in the form shown, comprises a resilient conducting arm 102 mounted at one end on an insulating member 104 secured to rear housing portion 16. Arm 102 is insulated from the remainder of the shutter mechanism and is connected with one terminal of a conventional receptacle or plug 106 secured to insulating member 104. The other terminal of plug 106 is grounded in the shutter housing together with connecting lever 90, and to insure a low resistance circuit through lever 90, the latter is connected to the grounded terminal of plug 106 by a lead wire 108. Conducting arm 102 is so positioned with respect to connecting lever 90 that the end of lever 90 contacts the free end of arm 102, completing a photoflash circuit when cover blind 56, together with lever 90 secured thereto, moves linearly parallel to the axis of slot 58 (generally to the right) at the moment of release of shutter disc 38 for rotation. To provide for optimum contact between lever 90 and arm 102, a flange 93 may be formed turned up from the end of lever 90 and adapted to make contact with conducting arm 102 to complete the circuit.

The shutter includes means for holding an exposure slot 40 in shutter disc 38 in an aperture-uncovering position during time exposures and, in the form shown in Figs. 2 and 5, comprises an L-shaped section 110 of detent spring 34 having a short dependent end section 112 adapted to engage shoulders 96 and thereby retain shutter disc 38 in a position with a slot 40 in alignment with the lens aperture. As a means for positioning end section 112 for engagement with a shoulder 96, shaft 80, pivotally mounted on post 81, includes a cam portion 114 positioned to engage and deform L-shaped section 110 of detent spring 34. Section 110 is normally so biased as to urge end section 112 toward shutter disc 38, cam portion 114 being pivotable into an "instantaneous" exposure position wherein it deforms section 110 so as to hold end section 112 out of engagement with shutter disc 38, and is pivotable into a "bulb" or time exposure position wherein it is out of engagement with section 110 of the detent spring and permits end section 112 to move toward shutter disc 38. A manually engageable knob 116 extending exteriorly of front housing portion 12 may be secured to shaft 80 for manually rotating said shaft and said cam section from one position to the other. In operation, in order to make a time exposure, cam section 114 is pivoted in a clockwise direction to the position shown in Fig. 2 allowing end section 112 to move into a position closely adjacent or in contact with the periphery of shutter disc 38. The shutter may then be cocked and actuated as previously described, and during the clockwise movement of the shutter disc a shoulder 96 is engaged by end section 112, thereby retaining a shutter slot 40 in alignment with the lens aperture. The duration of the time exposure is determined by the interval during which the operator holds cover blind 56 at its aperture-uncovering position and may be terminated by releasing actuating crank 76 to allow cover blind 56 to return to an aperture-covering position. The shutter remains set for time exposure and subsequent time exposures are effected in the same manner until cam section 114 is pivoted counterclockwise approximately 90° to an inoperable or "instantaneous" exposure position to withdraw spring 34 from engagement with a shoulder 96. A pair of pins 118 may be provided secured to rear housing portion 16 for limiting the pivotal movement of cam section 114. Suitable means may also be provided in association with cam section 114 and cooperating with crank 76 for automatically returning end section 112 of spring 34 to "instantaneous" exposure position following each time exposure. In addition, it is apparent that satisfactory time exposures can best be made using an exposure slot 40 which is longer than the diameter of the exposure aperture and in a shutter wherein disc 38 includes exposure slots of shorter length, means, such as a cam secured to diaphragm disc 20 and adapted to engage and retain end 112 of spring 34 out of engagement with shutter disc 38, may be provided. In a like manner, means such as an electrically insulated cam secured to disc 20 may be provided for engaging and deforming conducting arm 102 so that the flash circuit cannot be completed unless one of certain exposure slots 40, which are so formed as to provide an exposure in synchronism with the peak illumination of the flash lamp, is in position to provide the exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a shutter for photographic apparatus including a housing having an exposure aperture therein and at least one blade for covering said aperture mounted for rotary movement to and from an aperture-uncovering position, said blade being movable linearly in a plane substantially perpendicular to its axis of rotation, in combination, a member secured to said blade for imparting said rotary movement thereto, means for effecting the linear movement of said blade when the latter is in aperture-uncovering position, and switch means forming a part of a photoflash circuit, said switch means having a portion thereof so movable responsively to said linear movement as to electrically complete said circuit.

2. In a shutter for photographic apparatus, in combination, a housing having an aperture therein, at least one blade for covering said aperture mounted for rotary movement to aperture-uncovering position, said blade being movable linearly in a plane substantially perpendicular to its axis of rotation, an electrically conductive connecting lever secured at one end to said blade for imparting rotary aperture-uncovering movement to said blade, means for effecting the linear movement of said blade when the latter is in aperture-uncovering position, and an electrically conductive contact member mounted on said housing and insulated therefrom by insulating material, said connecting lever and said contact member being so constituted as to form a portion of a photoflash circuit and being so constructed and mounted with respect to one another that said connecting lever is moved into engagement with said contact member during linear movement of said blade to close said flash circuit.

3. In a shutter for photographic apparatus, in combination, a housing having an aperture therein, at least one blade for covering said aperture mounted for rotary movement to and from aperture-uncovering position, said blade being movable linearly in a plane substantially perpendicular to its axis of rotation, an electrically conductive connecting lever secured at one end to said blade for imparting rotary aperture-uncovering motion thereto, means for effecting the linear movement of said blade when the latter is in aperture-uncovering position, means for grounding said connecting lever in said shutter housing, means for closing a photoflash circuit during linear movement of said blade, said circuit-closing means including said shutter blade and an electrically conductive contact member mounted on said housing, means for insulating said contact member from said housing, and means connecting said contact member with a photoflash circuit, said connecting lever being so mounted as to be movable into engagement with said contact member by said blade during linear movement of the latter, said photoflash circuit being closed by engagement of said lever with said contact member.

4. In a shutter for photographic apparatus, in combination, a housing having an aperture therein, a shutter element mounted for movement on said housing, said element providing a closure for said aperture when in a rest position and providing for an open aperture during movement between said rest position and a displaced position, an elongated cover blade having a slot intermediate its ends and extending generally longitudinally thereof, said blade being mounted at said slot upon pivot means for both rotary movement about said pivot means and linear movement in the direction of said slot, said blade having an end section providing a closure for said aperture when at a stationary position and being pivotable to an aperture-uncovering position, a manually operable connecting lever secured at one end to said blade and being so mounted as to impart rotary aperture-uncovering movement to said blade, means comprising a portion of said cover blade for engaging and rotating said shutter element to said displaced position during rotary movement of said cover blade to said aperture-uncovering position, said connecting lever being so disposed as to exert a force on said blade in a direction generally parallel to the direction of said slot for disengaging said shutter element and releasing the latter for movement from said displaced position to said rest position, said connecting lever being electrically conductive and comprising one element of an electrical switch adapted to contact another element of said switch to complete a photoflash circuit during linear movement of said blade.

5. In a shutter for photographic apparatus, in combination, a housing having an aperture therein, a shutter element mounted for movement on said housing, said element providing a closure for said aperture when in a rest position and providing for an open aperture during movement between said rest position and a displaced position, an elongated cover blade having a slot intermediate its ends and extending generally longitudinally thereof, said blade being mounted at said slot upon pivot means for both rotary movement about said pivot means and linear movement in the direction of said slot, said blade having an end section providing a closure for said aperture when at a stationary position and being pivotable to an aperture-uncovering position, a manually operable crank, a connecting lever pivotally secured at one end to said crank and at its other end to said blade, said lever being so disposed as to impart a rotary aperture-uncovering movement to said cover blade, means comprising a portion of said cover blade for engaging and rotating said shutter element to said displaced position during rotary movement of said cover blade to said aperture-uncovering position, and spring means so disposed as to exert a force on said blade in a direction generally parallel to the direction of said slot when said blade is in aperture-uncovering position to effect the linear movement of said blade in the direction of said slot for disengaging said shutter element and releasing the latter for movement from said displaced position to said rest position, said connecting lever being electrically conductive and comprising an element of a photoflash circuit and being so movable during said linear movement of said blade as to complete said photoflash circuit in synchronism with the operation of said shutter.

6. In a shutter for photographic apparatus, in combination, a housing having an aperture therein, a shutter element mounted for movement on said housing, said element providing a closure for said aperture when in a rest position and providing for an open aperture during movement between said rest position and a displaced position, an elongated cover blade having a slot intermediate its ends and extending generally longitudinally thereof, said blade being mounted at said slot upon pivot means for both rotary movement about said pivot means and linear movement in the direction of said slot, said blade having an end section providing a closure for said aperture when at a stationary position and being pivotable to an aperture-uncovering position, a manually operable crank, a connecting lever pivotally secured at one end to said crank and at its other end to said blade, said lever being so disposed as to impart a rotary aperture-uncovering movement to said cover blade, means comprising a portion of said cover blade for engaging and rotating said shutter element to said displaced position during rotary movement of said cover blade to said aperture-uncovering position, and spring means so disposed as to exert a force on said blade in a direction generally parallel to the direction of said slot when said blade is in aperture-uncovering position to effect the linear movement of said blade in the direction of said slot for disengaging said shutter element and releasing the latter for movement from said displaced position to said rest position, and an electrical switch comprising at least two elements, one of said elements being mounted within said housing and insulated therefrom, said connecting lever being the other of said elements and being movable during linear movement of said cover blade into contact with said one of said elements.

7. In a shutter for photographic apparatus, in combination, a housing having an aperture therein, a shutter element mounted for movement on said housing, said element providing a closure for said aperture when in a rest position and providing for an open aperture during movement between said rest position and a displaced position, an elongated cover blade having a slot intermediate its ends and extending generally longitudinally thereof, said blade being mounted at said slot upon pivot means for both rotary movement about said pivot means and linear movement in the direction of said slot, said blade having an end section providing a closure for said aperture when at a stationary position and being pivotable to an aperture-uncovering position, a manually operable crank, a connecting lever pivotally secured at one end to said crank and at its other end to said blade, said lever being so disposed as to impart a rotary aperture-uncovering movement to said cover blade, means comprising a portion of said cover blade for engaging and rotating said shutter element to said displaced position during rotary movement of said cover blade to said aperture-uncovering position, and spring means so disposed as to exert a force on said blade in a direction generally parallel to the direction of said slot when said blade is in aperture-uncovering position to effect the linear movement of said blade in the direction of said slot for disengaging said shutter element and releasing the latter for movement from said displaced position to said rest position, an electrical contact comprising an element of a photoflash circuit secured within said housing and being electrically insulated therefrom by insulating material, means for grounding said connecting lever to said housing, said lever being electrically conductive and movable into contact with said electrical contact to close said photoflash circuit during linear movement of said cover blade.

References Cited in the file of this patent

UNITED STATES PATENTS

| | | |
|---|---|---|
| 2,472,587 | Harvey | June 7, 1949 |
| 2,490,755 | Hutchison | Dec. 6, 1949 |